Nov. 11, 1969  J. SÖHLEMANN  3,477,264
DUPLICATING MACHINE TOOL
Filed Dec. 21, 1967  3 Sheets-Sheet 1

INVENTOR
Just Söhlemann

ATTORNEYS

INVENTOR
Just Söhlemann

By

ATTORNEYS

Nov. 11, 1969  J. SÖHLEMANN  3,477,264
DUPLICATING MACHINE TOOL
Filed Dec. 21, 1967  3 Sheets-Sheet 3
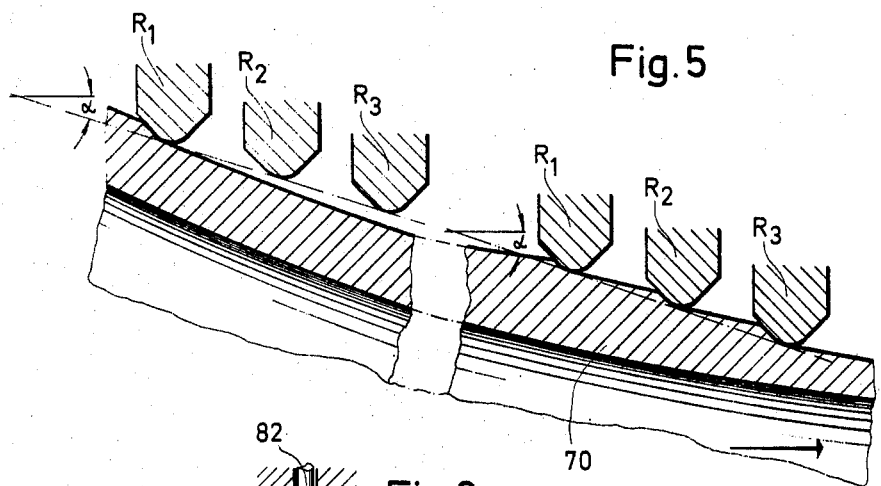
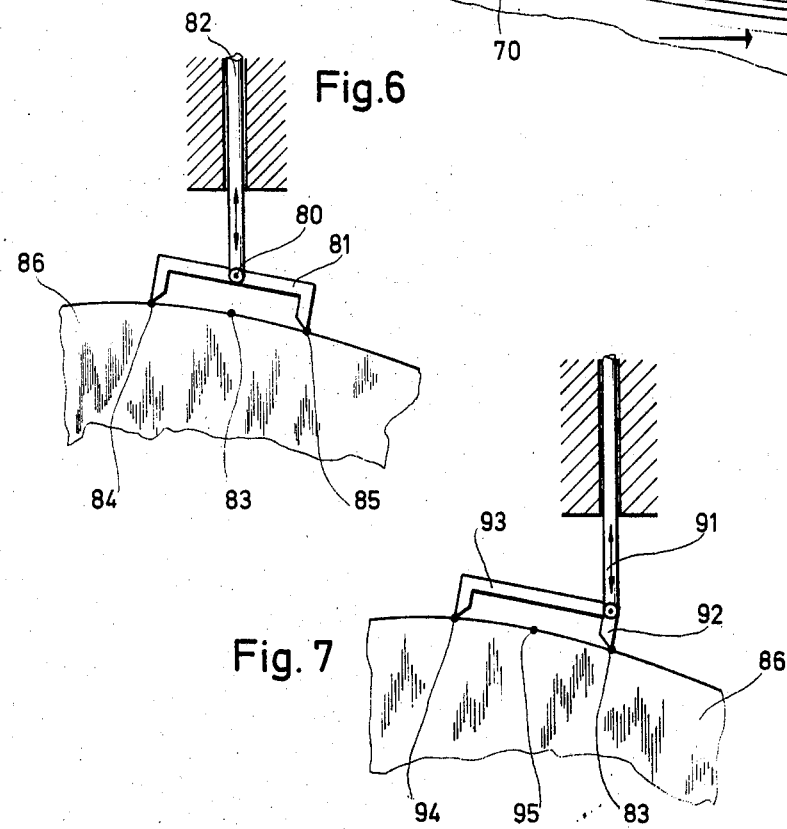
INVENTOR
Just Söhlemann
By
ATTORNEYS

United States Patent Office 3,477,264
Patented Nov. 11, 1969

3,477,264
DUPLICATING MACHINE TOOL
Just Söhlemann, Munich, Germany, assignor to Bolkow Gesellschaft mit beschrankter Haftung, Ottobrunn, near Munich, Germany
Filed Dec. 21, 1967, Ser. No. 692,377
Claims priority, application Germany, Dec. 22, 1966, B 90,421
Int. Cl. B21d 22/00
U.S. Cl. 72—81                                    10 Claims

ABSTRACT OF THE DISCLOSURE

The disclosure is directed to a duplicating machine tool including a plurality of tools, with one tool, serving as a guide tool, being controlled by a duplicating feeler scanning the contour of a duplicating templet, and the other tools being controlled by respective follower devices scanning the position of the guide tool. Each of the following tools is offset by a certain adjustable amount, relative to the guiding tool, in both a radial and axial direction with respect to the axis of the workpiece.

In accordance with the disclosure, a tangent feeler is associated with the duplicating feeler and has two contact points with a templet contour, the tangent feeler being set by the templet contour in an angular position corresponding substantially to the slope of the contour at the site or location of the duplicated point and controlling the adjustable radial offset, axial offset, or both of the follower tools in dependence on the angular position of the tangent feeler and through known transmission means. the tangent feeler may be either separate from the duplicating feeler or may be incorporated therewith.

BACKGROUND OF THE INVENTION

A known duplicating machine tool includes several tools directed radially relative to an axially symmetrical rotating workpiece and moved, by means of feeding means, in the direction of the axis of rotation of the workpiece. The adjustable path of a first tool, serving as a guide tool, is controlled in dependence on the position of a duplicating feeler scanning the contour of a duplicat- templet. The other tools follow the movement of the first tool, being driven by follower means scanning the position of the first or guide tool. Each following tool is offset by a certain adjustable amount relative to the guide tool and in both the radial and axial direction with respect to the axis of the workpiece.

During a revolution, each surface point of the workpiece passes successively all the tools distributed around the circumference of the workpiece. Each tool performs its own machining operation or stage, and is adjusted inwardly further than the tool of the preceding machining stage in correspondence to its required machining depth. In addition to the radial offset, the tools also are offset axially of the workpiece so that each tool, of a following machining stage, has sufficient freedom with respect to the workpiece surface still untreated by the preceding tool.

The radial and axial offset of the tools is always adapted to a certain slope of the workpiece contour. If the slope of the contour remains constant over the entire length of the workpiece, as in the case of cylindrical or conical workpieces, the offset provided by the required machining depth of each tool remains constant during the machining operation.

It has been found, however, that in the machining of workpieces having a varying slope of the contour, the fixed setting of the offset of the tools is no longer sufficient, since an optimum setting can be provided only at the point of the contour of the workpiece to whose associated contour tangent the offset of the tools is adapted. At all other points of the contour of the workpiece, either some of the tools do not attain the set machining depth or do not come in contact with the workpiece at all. This leads to inaccurate or irregular machining, or some tools penetrate too deeply into the workpiece, which can lead to damage of the respective tool.

It is already known to provide machine tools in which the adjustment path of each tool is controlled by a separate duplicating templet through a separate respective feeler. With this arrangement, it is always possible to adapt the radial offset of the tools to the varying slope of the contour of the workpiece, and thus to obtain the desired machining depth for each tool. The offset of each tool, which necessarily varies during the course of the machining, must thus be programmed in the respective duplicating templet.

It is obvious that such machines, apart from a larger supply of devices and templets, also require considerably more setting work as compared to a model using only one templet. In addition, such an arrangement, because of its high space requirements, can be incorporated only in larger machine tools.

SUMMARY OF THE INVENTION

This invention relates to duplicating machine tools, and, more particularly, to a novel and simplified arrangement for controlling the radial offset of successive tools in accordance with a variable contour of a templet.

The invention is directed to improving duplicating machine tools of the type mentioned above in such a way that, while avoiding the disadvantages of known solutions to the problem, the machining depth of all tools is maintained at its predetermined value during the machining of workpieces having variable slopes of their contours, and by adapting the radial offset and axial offset of the tools constantly to the slope of the contour.

In accordance with the invention, there is associated with the duplicating feeler a tangent feeler having two contacts wtih the templet contour. This tangent feeler is set, by the templet contour, in an angular position corresponding substantially to the slope of the contour at the site of the duplicated point. The tangent feeler controls, in dependence on this angular position and through known transmission means, the adjustable radial offset, axial offset, or both of the tools following the first or guide tool.

The invention is based upon the experimentally verified assumption that the secant scanned by the tangent feeler is sufficient as an approximation to the tangent of the templet contour, if the contact points are spaced sufficiently close to each other. A desirable spacing is of the order of the axial offset of the tools.

It is also sufficient, in most practical cases, if the radial and axial offset from tool to tool is equal and is varied in the same ratio. The tools are arranged on a three-dimensional spiral line with a uniformly varying diameter of its convolutions, or, in other words, on the shell of a circular cone. This circular cone opens in the direction of the still untreated part of the workpiece. A retracting or feeding movement of the tools corresponds, respectively, to a similar increase or decrease of diameter of the cone. The vertex angle or angle of aperture of the cone can be varied by varying the offset of the tools.

However, the present invention is applicable principally in machine tools with any desired offset between individual tools, and wherein the offset between adjacent tools may vary one from the other. It also includes the possibility of varying the offset of the tools in a certain ratio by a control program contained in the transmission means connecting the tangent feeler and the tools, for example, variable gearings.

In accordance with one feature of the invention, the tangent feeler consists of a feeler separated from the duplicating feeler, and having two scanning pins bearing on the templet to be scanned on opposite sides of the point to be scanned or duplicated. By scanning two points arranged laterally of the duplicating feeler, there is obtained the most accurate indication of the tangent slope in the proximity of the point to be duplicated. The mounting of the tangent feeler separately from the duplicating feeler makes it possible to equip already built machine tools of the above-mentioned type with the invention device, at a later time, and without any major changes.

In accordance with a further feature of the invention, the tangent feeler and the duplicating feeler are combined as a single scanner which can be displaced in the direction of a coordinate of the templet contour and also turned about an axis extending perpendicular to the plane of the templet contour. This combined scanner has two contact points with a templet contour. The displacability permits the scanner to follow the coordinates of the templet contour, and the rotatability or angular adjustability permits the setting of the templet to correspond to the slope of the contour. Both movements are transmitted separately, the displacement movement controlling the adjustment of the tools and the rotary movement controlling the offset of the tools.

In accordance with one embodiment of the invention, the point to be duplicated is about in the middle between the two contact points between the tangent scanner and the templet. In his way, there is obtained a very accurate approximation to the tangent to the point to be duplicated. The point itself is not scanned, but its mean is determined by the tangent scanner from the position of the two contact points.

In another embodiment of the invention, the point to be duplicated coincides with one of the two contact points between the scanner and the templet. In this arrangement, the tangent extending either forwardly or rearwardly of a templet point to be duplicated is scanned simultaneously with scanning of the point to be duplicated. It is thus possible to attain certain advantageous effects, or disadvantageous effects, depending upon which direction, forwardly or rearwardly of the point to be duplicated, the tangent extends. For example, since the templet slope, when the tangent extends forwardly, is already scanned before the tools have reached the corresponding point of the workpiece, any inertia of the tool feed can be compensated.

In a preferred embodiment of a duplicating machine tool, the angular position of the tangent feeler is transmitted over known transmission means. Such a preferred embodiment of a duplicating machine tool may comprise, for example, a duplicating fluid pressure operated machine having hydraulic feed and control of three equally spaced working rollers engaging the circumference of the workpiece and offset at fixed axial distances, and where the radial offset of the following working rollers is adjustable with regard to a first working roller acting as a guiding tool by mechanical displacement through spindles of hydraulic follower control devices of each following pressure roller. In such a machine, the known transmission means may comprise, for example, electric measuring value transmitters, variable gain amplifiers and electric servomotors, these transmission means transmitting the angular position of the tangent feeler to the spindles of the following working rollers.

An object of the present invention is to provide an improved and simplified duplicating machine tool.

Another object of the invention is to provide such a duplicating machine tool which, while avoiding disadvantages of known duplicating machine tools, maintains the machining depth of all tools at a predetermined value during machining of workpieces having varying slopes of their contours.

A further object of the invention is to provide such a duplicating machine tool in which the radial and axial stagger of the tool is always adapted to the slope of the contour to be machined.

Still another object of the invention is to provide such a duplicating machine tool including a tangent feeler associated with the duplicating feeler and having two contact points with a templet contour.

A further object of the invention is to provide such a tangent feeler which is set, by the templet contour, in an angular position corresponding substantially to the slope of the contour at the site of the duplicated point and which controls, in dependence on its angular position and through known transmission means, the adjustable radial offset, axial offset, or both of following tools.

Yet, another object of the invention is to provide such a duplicating machine tool in which the tangent feeler consists of a feeler separated from the duplicating feeler and having two scanning pins bearing on the templet contour on opposite sides of the point to be scanned or duplicated.

A further object of the invention is to provide such a tangent feeler which may be applied to existing machine tools without any measured changes.

Yet, another object of the invention is to provide such a duplicating machine tool in which the tangent feeler and the duplicating feeler are combined in a single scanner which can be displaced in the direction of a coordinate of the templet contour or turned about an axis perpendicular to the plane of the templet contour and which has two points of contact with the templet contour.

A further object of the invention is to provide such an improved duplicating machine tool in which the point to be duplicated coincides with one of the two contact points between the templet contour and the tangent scanner.

BRIEF DESCRIPTION OF THE DRAWINGS

For an undersanding of the principles of the invention, reference is made to the following description of typical embodiments thereof as illustrated in the accompanying drawings.

In the drawings:

FIG. 5 is a view similar to FIGS. 3 and 4 illustrating the machining of a workpiece having curved generatrices and where the offset of the tools is fixed;

FIG. 6 is a somewhat schematic side elevation view of a combination duplicating feeler and tangent feeler with a symmetrically arranged axis of angular displacement; and FIG. 7 is a view similar to FIG. 6 but with the feeler having an asymmetrically arranged axis of angular displacement.

DESCRIPTION OF THE PREFERRED
EMBODIMENTS

In order to be able to better describe the arrangement according to the invention, the usual construction of a duplicating machine tool will first be explained with reference to an example of the duplicating fluid pressure machine represented in FIG. 1.

Figure 1:
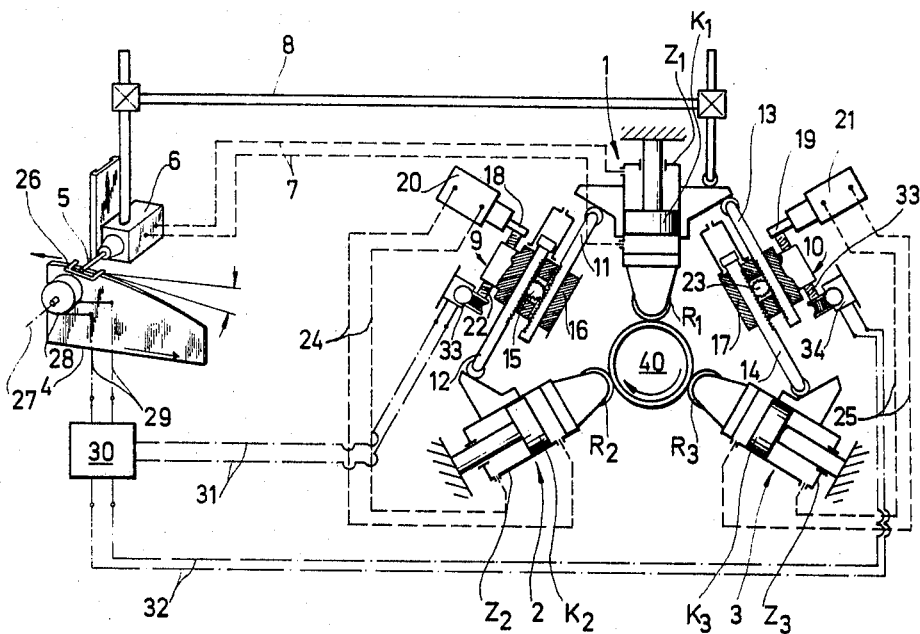
FIG. 1 is a diagrammatic illustration of the hydraulic tool control of a duplicating fluid pressure machine with the radial offset of the working tools controlled by means of a tangent feeler embodying the invention.

Referring to FIG. 1, a workpiece 40, rotating in the direction of the arrow, is machined by three pressure tools 1, 2 and 3 which are evenly distributed around the circumference of the workpiece. Each pressure tool consists of a piston (K1, K2, K3) connected with the machine frame, a cylinder (Z1, Z2, Z3) displaceable with respect to the piston, and a pressure roller (R1, R2, R3) connected with the cylinder.

The movement of the pressure tool acting as a guiding tool is controlled by the duplicating feeler 5 scanning the contour of a templet 4. The deviation of duplicating feeler 5 from a center position is transmitted to a hydraulic control valve 6, which controls the movements of cylinder Z1 through the hydraulic lines 7. The respective position of cylinder Z1 is transmitted mechanically, through linkage 8, to the slidably mounted housing of valve 6. The latter is thus displaced, in the same sense as cylinder Z1, until duplicating feeler 5 assumes again its center position.

The two pressure tools 2 and 3, as well as the respective follower control devices 9 and 10, are completely identical and have the same function. For this reason, only one of the tools 2 and 3, with its control device, will be described, the reference numbers related to the other tool 2 or 3 being added in brackets.

The movement of cylinder Z1 is transmitted, in a known manner, through a rack 11 (13) displaceable in a longitudinal direction, and the movement of rack 11 (13) is transmitted to a pinion 15 (23) which rolls along a second rack 12 (14) moving housing 16 (17) in which the pinion is rotatably supported. The displacement of the housing is transmitted, through a feeler pin 18 (19), to a hydraulic control valve 20 (21) which controls cylinder Z2 (Z3) corresponding to the direction of movement of cylinder Z1. The movement of the following cylinder Z2 (Z3) is re-transmitted mechanically, through rack 12 (14), to pinion 15 (23). When cylinder Z2 (Z3) has reached the nominal position corresponding to the position of cylinder Z1, the pinion and housing, and thus also a guide pin 18 (19), are again in their neutral position and the follow-up cylinder Z2 (Z3) remains in its position.

The bearing point of feeler pin 18 (19) is represented by a spindle 22 (23) arranged for displacement in housing 16 (17). If the position of spindle 22 (23) is changed, feeler pin 18 (19) is deflected, transmitting, to cylinder Z2 (Z3), a corresponding control signal. The cylinder is thus offset radially with respect to the stationary cylinder Z1 until housing 16 (17) assumes a new neutral position in which feeler pin 18 (19) is not deflected. The broken lines 24 (25) represent the hydraulic lines connecting hydraulic control valve 20 (21) and the respective cylinder Z2 (Z3).

Figure 2:
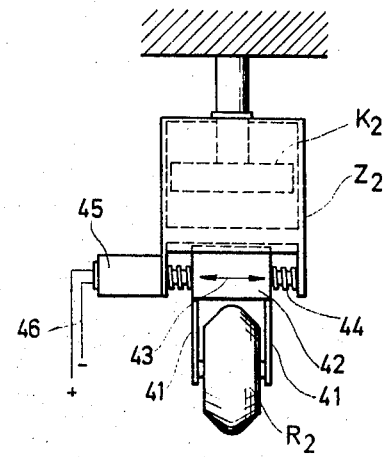
FIG. 2 is a somewhat diagrammatic elevation view illustrating an arrangement for controlling the axial offset of a working roller.

For adjusting the axial offset, the rollers R2 and R3 are mounted for displacement on the respective cylinders Z2 and Z3, in the manner shown in FIG. 2. The fork arms 41 carrying the axle of roller R2 are secured on a slide 42 which is mounted on cylinder Z2 for displacement in the direction of the workpiece axis as indicated by the arrows 43. The slide can be moved by a spindle 44 which is driven by a servomotor 45.

The invention arrangement provides for varying the axial offset and radial offset of the rollers during the operation and in such a way that these are always adapted to the course of the workpiece contour. For this purpose, there is associated with duplicating feeler 5 a fork-shaped tangent feeler 26 having two scanning pins bearings, at opposite sides of duplicating feeler 5, on templet 4. Tangent feeler 26 is angularly adjustable or rotatable about its axis 27, and actuates, in its rotation, a potentiometer 28 acting as an angular value transmitter. The measuring value of potentiometer 28 is transmitted, over electric lines 29, to a variable gain amplifier 30 and, from amplifier 30, in a dependence programmed into the variable gain amplifier, to the electric servomotors which actuate the spindles for adjusting the stagger of the rollers.

Conductors 31 (32) lead to servomotors 33 (34) for controlling the radial offset. The servomotors for controlling the axial offset are not represented in FIG. 1, for reasons of clarity. FIG. 2 shows the arrangement of a servomotor 45 for controlling the axial offset, and which can be connected by conductors 46 to variable gain amplifier 30.

Figure 3:
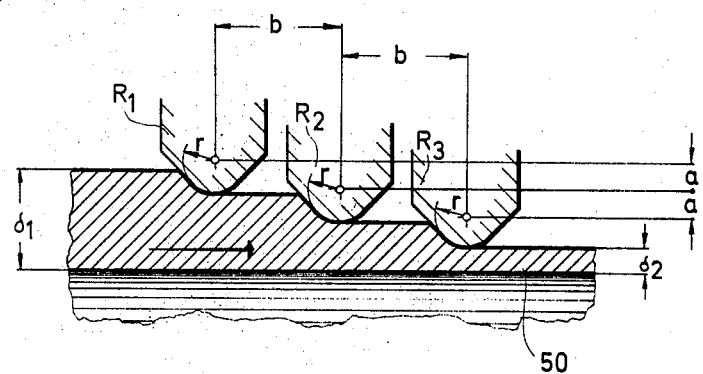
FIG. 3 is a schematic representation of three working rollers, having radial and axial offset, during the machining of a cylindrical workpiece.
Figure 4:
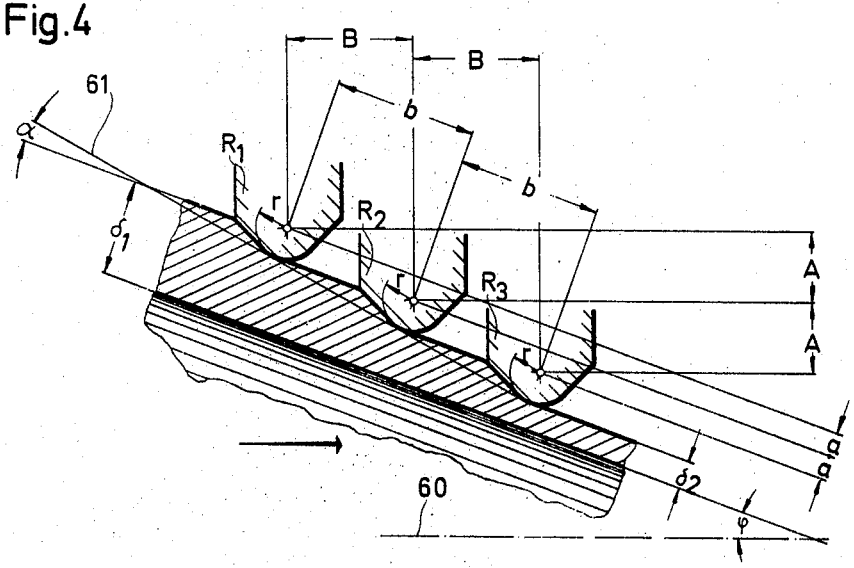
FIG. 4 is a view similar to FIG. 3 illustrating the machining of a conical workpiece.

Each of FIGS. 3, 4 and 5 illustrates a longitudinal section through a part of a workpiece in the machining zone. The pressure rollers R1–R3 are distributed around the circumference of the workpiece, and only the part of the roller circumference engaging the workpiece is represented. The rollers R1–R3 are turned into the sectional plane for illustration purposes. The radial and axial offset is the same from tool to tool. As mentioned above, such an arrangement is sufficient in practice in most cases.

The workpiece 50 shown in FIG. 3 has cylindrical form, that is, it has straight and coaxial generatrices. Its direction of feed is indicated by the arrow. Before the machining operation, workpiece 50 has the wall thickness $\delta_1$ and, after machining, the workpiece has the wall thickness $\delta_2$. The radial offset between the tools is designated $a$ and the axial offset is designated $b$.

In order to maintain, even with varying slope of the workpiece contour, the radial offset $a$ and the axial offset $b$ of the pressure rollers R1–R3 with respect to the workpiece surface, as indicated, by way of example, in FIG. 4, the radial offset A and the axial offset B, related to the workpiece axis 60, must be variable. In the example represented in FIG. 4, the dependence of angle $\phi$ which corresponds to the slope of the workpiece contour and is scanned by the tangent feeler, on the required offsets A and B can be determined from the following angular relations:

$$\text{Radial Offset } A = \sqrt{a^2 + b^2} \sin(\alpha + \phi)$$

$$\text{Axial Offset } B = \sqrt{a^2 + b^2} \cos(\alpha + \phi)$$

Angle $\alpha$ is the angle between the workpiece contour and the common tangent 61 to the pressure rollers.

FIG. 5 illustrates a workpiece having a variable slope of its contour and with rigid setting of the offset of the rollers. With a rising contour, only roller R1, which is controlled by duplicating templet 5, is firmly in engagement with workpiece 70, while following rollers R2 and R3 no longer touch the workpiece, as illustrated in the left part of FIG. 5. This situation is avoided by using the tangent feeler forming the subject matter of the invention.

Referring to FIG. 6, the feeler therein illustrated consists of the scanner 81 extending perpendicularly to the plane of the drawing and rotating about an axle 80 which appears as a point in the drawing. Scanner 81 is also mounted for displacement in the direction of the axis of plunger 82. The rotary and axial displacement movements are transmitted separately by known means (not shown) for controlling the offset and the adjustment, respectively, of the rollers. The point 83 of the templet 86, which point is to be duplicated, is not scanned directly, but its mean value is determined from the two bearing points 84 and 85 of scanner 81 on the templet contour.

The feeler shown in FIG. 7 provides for exact scanning of the point 83 to be duplicated, since the arm 92 of scanner 93, as an extension of the axis of plunger 91, or as a substantial extension thereof, bears directly on this point 83. However, in contrast to the example shown in FIG. 6, it is not the tangent of point 83 that is being determined but rather the tangent to templet 95 lying approximately midway between points 83 and 94. This fact can be utilized, as already mentioned above, for compensating any inertia effects in the control of the radial and axial offset of the tools.

What is claimed is:

1. For use with a duplicating machine tool of the type including a plurality of tools oriented radially toward an axi-symmetrical rotating workpiece, feeding means moving the tools toward the axis of rotation of the workpiece, a duplicating feeler engaging the contour of a duplicating templet and controlling, through control means, the movement of a first tool, acting as a guiding tool, relative to the workpiece axis, and follower means scanning the position of the guiding tool and controlling, through adjusting means, the movements, relative to the workpiece axis, of the tools following the guiding tool, each following tool being offset, with respect to the guiding tool, by a predetermined adjustable amount radially and axially of the workpiece and relative to the workpiece axis: the improvement comprising, in combination, a tangent feeler operatively associated with said duplicating feeler and having two longitudinally spaced points of contact with the contour of said templet; means mounting said tangent feeler for angular adjustment in accordance with the templet contour, whereby said tangent feeler has an adjusted angular position corresponding substantially to the slope of the templet contour at the site of the duplicating point of the templet contour engaged by said duplicating feeler; and transmission means operatively interconnecting said tangent feeler and said adjusting means and controlling the adjusted positions of said following tools relative to the workpiece axis in accordance with the adjusted angular position of said tangent feeler.

2. For use with a duplicating machine tool, the improvement claimed in claim 1, in which said tangent feeler is independent of said duplicating feeler and comprises two longitudinally spaced pins engaging said templet contour on respective opposite sides of said duplicated point of the templet contour engaged by said duplicating feeler.

3. For use with a duplicating machine tool, the improvement claimed in claim 1, in which said tangent feeler and said duplicating feeler are combined into a single feeler mounted for displacement in the direction of a coordinate of the templet contour, angularly adjustable, in accordance with the templet contour, about an axis extending perpendicularly to the plane of the templet contour, and having two contact points with the templet contour.

4. For use with a duplicating machine tool, the improvement claimed in claim 1, in which the duplicate point of the templet contour engaged by said duplicating feeler is positioned approximately midway between the two spaced points of contact of the tangent feeler with the templet contour.

5. For use with a duplicating machine tool, the improvement claimed in claim 1, in which one of the two points of contact of said tangent feeler with the templet contour coincides with the duplicated point of the templet contour engaged by said duplicating feeler.

6. For use with a duplicating machine tool, the improvement claimed in claim 5, in which said tangent feeler and said duplicating feeler are combined into a single feeler, which is displaceable in the direction of a coordinate of the templet contour, angularly adjustable about an axis extending perpendicular to the plane of the templet contour, and having two points of contact with the templet contour.

7. For use with a duplicating machine tool, the improvement claimed in claim 1, in which said duplicating machine tool is a duplicating fluid pressure machine tool; said feeding means and said control means being hydraulic feeding means and hydraulic control means; said tools comprising three pressure rollers offset relative to each other at fixed distances axially of the workpiece axis and positioned at equal angular spacings around the circumference of the workpiece; said follower means comprises respective hydraulic follower control devices for each of the two pressure rollers following said first pressure roller; said adjustment means comprising respective rotatable spindles each operable to mechanically displace the associated hydraulic follower control device to adjust the radial position of the associated following pressure roller with respect to the pressure roller acting as a guiding tool; said transmission means operatively connecting said tangent feeler to each of said spindles.

8. For use with a duplicating machine tool, the improvement claimed in claim 7, in which said transmission means includes electric servomotors each operating a respective spindle in accordance with the adjusted angular position of said tangent feeler.

9. For use with a duplicating machine tool, the improvement claimed in claim 8, in which said transmission means further includes a measuring value electric transmitter operable by said tangent feeler in accordance with the adjusted angular position thereof, and a variable gain amplifier having its input connected to the output of said measuring value transmitter and its output connected to said electric servomotors.

10. For use with a duplicating machine tool, the improvement claimed in claim 9, in which said electric measuring value transmitter is a potentiometer adjusted by said tangent feeler in accordance with the adjusted angular position of the latter.

References Cited

UNITED STATES PATENTS

| | | | |
|---|---|---|---|
| 3,104,640 | 9/1963 | Sassen et al. | 72—81 |
| 3,220,236 | 11/1965 | Storch et al. | 72—81 |

RICHARD J. HERBST, Primary Examiner